United States Patent [19]
Poulter et al.

[11] Patent Number: 5,767,221
[45] Date of Patent: Jun. 16, 1998

[54] ROBUST PROPELLANT LINER AND INTERFACIAL PROPELLANT BURN RATE CONTROL

[75] Inventors: Larry W. Poulter, Ogden; Ronald W. Nelson; Robert B. Smalley, Jr., both of Brigham City; Marvin C. Hawkins, Tremonton, all of Utah

[73] Assignee: Thiokol Corporation, Ogden, Utah

[21] Appl. No.: 448,825

[22] Filed: May 24, 1995

[51] Int. Cl.$^6$ ..................................................... C08G 18/16
[52] U.S. Cl. ................................ 528/51; 528/75; 525/417; 524/707
[58] Field of Search ..................... 528/51, 75; 525/417; 524/707

[56] References Cited

U.S. PATENT DOCUMENTS

| | | | |
|---|---|---|---|
| 4,009,130 | 2/1977 | Zimmerman et al. | 521/121 |
| 4,187,215 | 2/1980 | Wrightson | 528/51 |
| 4,331,871 | 5/1982 | Allinikov | 250/302 |
| 5,273,785 | 12/1993 | Sinclair et al. | 427/299 |

Primary Examiner—Rachel Gorr
Attorney, Agent, or Firm—Ronald L. Lyons, Esq.; Cushman Darby & Cushman IP Group of Pillsbury Madison & Sutro, LLP

[57] ABSTRACT

A robust polyurethane liner is disclosed for solid propellant rocket motors which is insensitive to large variations in stoichiometry, exhibits increased cohesive strength and, when used in combination with a unique two coat (wet coat) liner process described below, modifies the ballistic properties of the adjacent interfacial propellant layer. The liner compositions include a polymeric binder having a plurality of reactive hydroxyl functional groups and a curing agent having a plurality of reactive isocyanate functional groups. The quantity of binder and curing agent is selected such that the NCO/OH ratio is in the range from 1.5 to 4.5. Diisocyanate curing agents are particularly useful. A bonding agent, such as a polyfunctional aziridine compound, is typically present in the liner composition in an amount ranging from about 3% to about 5%, by weight. An oligomer catalyst is included in the liner composition in an amount ranging from about 15% to about 50%, by weight. Diammonium phosphate (($NH_4$)$_2$$HPO_4$) functions as an oligomer catalyst and as a ballistic modifier to inhibit propellant burn rate when the liner is cured concurrently with the propellant. A colorant, such as rhodamine B, may optionally be included to assist in determining coverage or thickness of the liner coating.

20 Claims, 3 Drawing Sheets

ROBUST PROPELLANT LINER AND INTERFACIAL PROPELLANT BURN RATE CONTROL

FIELD OF THE INVENTION

The present invention relates to a robust polyurethane liner for solid propellant rocket motors which is insensitive to large variations in stoichiometry, exhibits increased cohesive strength and, when used in a wet coat process, is capable of modifying the ballistic properties of the adjacent interfacial propellant layer. The present invention also provides an optional labeling technique which provides a visual and/or ultraviolet fluorescent method for monitoring coverage and controlling thickness of the wet coat liner.

BACKGROUND OF INVENTION

Rocket motors employing solid propellants typically include a rigid outer casing or shell; a heat insulating layer (insulation) bonded to the inner surface of the casing; a liner layer (liner) bonded to the insulating layer; and a solid propellant grain bonded to the liner. The insulation is generally fabricated from a composition capable of withstanding the high temperature gases produced when the propellant grain burns, thus, protecting the case. The liner is an elastomeric composition which must bond the propellant grain to the insulation and to any uninsulated portions of the case, as well as inhibit interfacial burning.

Polyurethane liners, used in a large number of rocket motors, are very sensitive to variations in stoichiometry, i.e., the isocyanate/hydroxyl equivalents ratio (NCO/OH). They are typically formulated at an NCO/OH ratio between 1.0 and 1.5. A slight excess of isocyanate (NCO) is required to compensate for curative diffusion into the insulation, the presence of moisture which is reactive with isocyanates, and other process variables which may reduce the isocyanate presence. The liner becomes very soft and/or does not cure at NCO/OH ratios of less than 1.0 or greater than 1.5. Process variables such as moisture contamination, relative humidity, ingredient migration (diffusion), weighing errors, misformulation and other parameters which may directly or indirectly affect the NCO/OH ratio can greatly alter liner properties. NCO/OH ratio variations as small as 0.10 from nominal can result in a soft, degraded propellant to liner to insulation bondline, bond failure and potential motor malfunction. Very rigorous process controls must therefore be imposed with polyurethane liners in order to maintain critical bondline integrity.

A second function of the liner is to inhibit the burning surface of the propellant grain when the interface is exposed to the flame front. There are several basic propellant grain configurations. The two most commonly used configurations are the center perforated grain and the end burning grain. In the center perforated grain configuration, the flame front advances radially from the center perforation to the outer casing. The insulating layer and liner are not exposed to the flame front or hot gases until near the end of motor firing in this configuration. In the end burning grain configuration, the flame front advances axially from the nozzle end of the motor to the forward dome. The insulation and liner are directly exposed to the hot combustion gases as the flame front advances in this configuration. The insulation in the aft section of the motor has the longest exposure time and the insulation in the forward section has the least exposure time.

End burning propellant grains are particularly sensitive to interfacial burn rate gradients since the flame front advancement is perpendicular to the interface. These interfacial burn rate gradients cause the propellant to burn at a different rate near the liner bondline. Interfacial ballistics are complex in nature but are believed to be a function of several factors including propellant ingredient diffusion, particle alignment and/or particle size stratification during propellant casting, and localized radiant/convective heat transfer conditions at the liner interface.

Propellant ingredient diffusion into the liner changes the propellant composition and therefore the burn rate at the liner interface. Curative and plasticizer diffusion, for example, results in a higher solids and therefore a higher burn rate propellant at the interface. Conversely, burn rate catalyst diffusion results in a catalyst deficient and, therefore, a slower burning propellant at the interface. Particle size distribution changes at the interface and preferential alignment of solid particulate ingredients with a length to diameter ratio greater than one during propellant casting typically result in a propellant burn rate gradient near the liner interface. Localized heat transfer conditions can also affect propellant temperature and burn rate at the interface.

It is undesirable to have large and uncontrolled propellant burn rate gradients in a rocket motor design. Burn rate gradients result in progressive changes in propellant burning surface area, chamber pressure, motor thrust and, in the case of end burning grains, unpredictable insulation exposure times. Motor design and performance are therefore somewhat unpredictable and exhibit a high degree of variability. In extreme cases, severe burn rate gradients have resulted in motor malfunction.

From the foregoing, it would be a significant advancement in the art to provide a solid rocket motor propellant liner which is insensitive to large variations in stoichiometry, which is insensitive to adverse process conditions including high relative humidity, residual moisture in liner ingredients and residual moisture in the insulation substrate, and which is able to modify and/or control the ballistic properties of the adjacent interfacial propellant layer. It would also be a significant advancement in the art to provide an in situ labeling technique for liner application monitoring and control.

Such solid rocket motor propellant liner compositions are disclosed and claimed herein.

SUMMARY OF THE INVENTION

The present invention is directed to a robust polyurethane or polythiourethane liner for solid propellant rocket motors which is insensitive to large variations in stoichiometry, exhibits increased cohesive strength and, when used in combination with a unique two coat liner process described below, has the ability to modify the ballistic properties of the adjacent interfacial propellant layer.

The currently preferred liner compositions within the scope of the present invention include a polymeric binder having a plurality of reactive hydroxyl functional groups and a curing agent having a plurality of reactive isocyanate functional groups. The quantity of binder and curing agent is selected such that the NCO/OH ratio is in the range from 1.5 to 4.5, preferably from about 2 to 4, and most preferably from about 2 to 3. Those skilled in the art will appreciate that the binder may include a plurality of reactive thiol functional groups to perform the same function as hydroxyl groups. Thus, the NCO/OH ratios discussed herein also apply to NCO/SH ratios. The combination of binder and curing agent usually represents about 35% to 60%, by weight, of the liner composition. Cure catalysts are often included to facilitate curing of the binder and curing agent.

The curing agent is a polyfunctional isocyanate, preferably a diisocyanate curing agent. Currently preferred diisocyanate curing agents include m-tetramethyl xylene diisocyanate (TMXDI), isophorone diisocyanate (IPDI), dimeryl diisocyanate (DDI), and toluene 2,4-diisocyanate (TDI).

A bonding agent is preferably provided to help strengthen the polymeric matrix which strengthens the propellant to liner interface. The bonding agent is preferably present in the liner composition in an amount ranging from about 3% to about 5%, by weight. Currently preferred bonding agents are polyfunctional aziridine compounds.

An oligomer catalyst is preferably included in the liner composition in an amount ranging from about 5% to about 50%, by weight. An oligomer catalyst which has provided very good results is diammonium phosphate $((NH_4)_2HPO_4)$. Diammonium phosphate also functions as a ballistic modifier to inhibit propellant burn rate. Other known ballistic modifiers may also be included.

An inert filler, such as titanium dioxide $(TiO_2)$, carbon black, or silica oxide, is preferably present in the liner composition in an amount ranging from about 5% to about 40%, and more preferably from about 10% to about 30%, by weight. A colorant, such as rhodamine B, may optionally be included to assist in determining coverage or thickness of the liner coating.

The robust, stoichiometry insensitive liner composition containing a ballistic modifier, when used in a unique two coat or wet coat process, provides interfacial propellant burn rate control. The first coat of liner is applied to the interior surface of the rocket motor chamber covering all propellant contacting surfaces. The first coat of liner is partially or fully cured prior to application of a subsequent coat. The second coat (approximately 5 mils thick) of liner, or "wet coat," is applied over the first coat but not cured prior to propellant casting. The second coat of liner is preferably formulated to contain the appropriate ballistic modifier(s) in place of all or a portion of the total filler content. It will be appreciated at least one wet coat is applied over any number of cured coats to produce the desired results. The propellant is cast into the motor chamber under vacuum to promote intimate contact and intermixing of the wet coat liner with the adjacent propellant layer. This process results in dispersement of the wet coat liner and contained ballistic modifier into the adjacent propellant layer and a corresponding modification of interfacial propellant burn rate.

DETAILED DESCRIPTION OF THE INVENTION

The present invention is directed to a urethane or thiourethane liner composition containing an oligomer catalyst to form a robust, stoichiometry insensitive liner and a ballistic modifier which, when used in a unique two coat process, will also provide interfacial propellant burn rate control. A colorant added to the second coat will provide visual and/or UV fluorescence coverage and thickness detection methods. Currently preferred robust liner formulations are summarized below.

ROBUST LINER FORMULATION

| Ingredient | Composition (parts) | |
| --- | --- | --- |
| | Cured Coat | Wet Coat |
| hydroxy terminated polymer binder } | 35–60* | 45–60* |
| isocyanate curing agent } | | |
| bonding agent present | 3–5 | 3–5 |
| reactive filler (oligomer catalyst/ burn rate suppressant) | 5–40 | 20–50 |
| inert filler | 10–30 | — |
| thixotrope | 2–3 | — |
| cure catalyst | 0–0.5 | 0–0.5 |
| colorant | — | 0.001–0.01 |

*NCO/OH ratio = 1.5–4.5

The robust liner composition described above comprises the reaction product of a prepolymer binder which is terminated with hydroxyl or other functional groups which react with a isocyanate, a diisocyanate, polyisocyanate or oligomer of an isocyanate curing agent which will react with the binder to form a urethane or analogous linkage, a bonding agent, such as a conventional aziridine bond promoter, a reactive filler which may function as an oligomer catalyst and/or a propellant burn rate modifier, an inert filler, a thixotropic agent, a cure catalyst, and a colorant. The formulation shown above is a presently preferred for baseline formulation. Many of the ingredient substitutions and alternatives obvious to one skilled in the art are available, several of which have been successfully demonstrated. The nature and function of each major ingredient, alternates and substitutions are discussed in the following paragraphs.

Binder. The prepolymer binder used herein include organic compounds having at least two active hydrogen providing moieties, preferably hydroxyl or thiol moieties, capable of reacting with a polyisocyanate to form urethane or thiourethane linkages. The presently preferred prepolymers are compounds having the formula:

HO—R—OH

HS—R—SH where "R" is a divalent organic radical. The hydroxyl or thiol groups may be of any type suitable for forming urethane or thiourethane linkages with isocyanate groups. Hydroxy terminated polybutadiene (HTPB) polymers are currently preferred binders.

Isocyanate Curing Agent. The isocyanates useful as curing agents herein include di-, tri-, and polyfunctional organic isocyanates. Diisocyanates are currently preferred. Both alkylene and arylene isocyanates are suitable. Currently preferred isocyanates include m-tetramethyl xylene diisocyanate (TMXDI), isophorone diisocyanate (IPDI), dimeryl diisocyanate (DDI), and toluene 2,4-diisocyanate (TDI).

Bonding Agent. Bonding agents or bond promoters are typically mobile, reactive ingredients which diffuse from the liner into the interfacial propellant and react with the ammonium perchlorate oxidizer, propellant binder, or other propellant ingredients to enhance bondline properties. Conventional, state of the art, bond promoters include diand tri-functional aziridine (i.e.. cyclic ethylene imines) compounds. One well known bonding agent. 1.1-[1.3-phenylene dicarbonyl bis(2-methylaziridine], known in the industry as HX-752 (manufactured by 3M). is a currently preferred bonding agent.

Reactive Filler(s). A reactive filler or mixture of reactive fillers are included to function as an oligomer catalyst and/or a propellant burn rate modifier, described below.

Oligomer Catalyst. The oligomer catalyst causes excess isocyanates present in the liner to form dimer, trimer, and tetramer structures of the isocyanate as shown below:

2 OCN—R—NCO ⟶

(DIMER)

3 OCN—R—NCO ⟶

(TRIMER)

4 OCN—R—NCO ⟶

(TETRAMER)

The presently preferred catalyst evaluated in this invention is diammonium phosphate, $(NH_4)_2HPO_4$. Other known catalysts include, but are not limited to, calcium acetate, sodium formate, sodium carbonate, sodium methoxide, tertiary amines such as triethylamine, oxalic acid, sodium benzoate in dimethyl formamide, soluble metal compounds of iron, sodium, potassium, magnesium, mercury, nickel, copper, zinc, aluminum, tin, vanadium, and chromium, titanium tetra butyrate, oxygen and Friedel-Crafts type reagents.

Propellant Burn Rate Modifier. A propellant burn rate modifier causes a decrease or an increase in propellant burn rate to compensate for interfacial burn rate changes. The currently preferred burn rate modifier, which also functions as a catalyst, is diammonium phosphate. $(NH_4)_2HPO_4$. Diammonium phosphate is intended for use in bondlines where curative migration, plasticizer migration, oxidizer particle alignment, oxidizer particle stratification or other variables cause significant increases in interfacial propellant burn rates. Other burn rate suppressants which may be used in the practice of the present invention include, but are not limited to, dicyanoguanidine, $NH_2COCONH_2$ (oxamide). Dechlorane plus (a chlorinated hydrocarbon made by Occidental Chemical). $NH_4F$, $NH_4Cl$, $NH_4Br$, $NH_4I$, $NH_4PF_6$. $(NH_4)_2SiF_6$, $NH_4BF_4$, $ZnF_2$, $ZnBr_2$, n-bromosuccinimide, hexabromocyclododecane, pentabromodiphenyl oxide, decabromodiphenyl oxide, Firemaster 836, tetrabromophthalate diol. $Sb_2O_3$, $Bi_2O_3$, triphenyl antimony, diammonium bitetrazole, 5-aminotetrazole, aluminum hydroxide, calcium oxalate, ammonium sulfate, ammonium oxalate, ammonium polyphosphate, and other flame retardants, ballistic modifiers and other materials obvious to one skilled in the art. Burn rate catalysts, for use in bondlines where the interfacial propellant burn rate has been significantly decreased, include ferric oxide, ferrocene, n-butyl ferrocene, catocene, aluminum oxide, copper chromite, and other catalysts known in the art. Selection of the optimum burn rate modifier must be tailored to the specific propellant and interfacial conditions.

Other Additives. Other liner ingredients may include but are not limited to inert fillers, thixotropic agents, cure catalysts, colorants, plasticizers, coupling agents, reinforcing agents and other specialty additives.

Two Coat Liner Process.

The robust liner may be used in a conventional single or multicoat process in which the liner is cured or partially cured prior to application of the subsequent coat or prior to propellant casting. However, a unique two coat process is required for interfacial propellant burn rate control. The first coat of liner is applied to the interior surface of the rocket motor chamber covering all propellant contacting surfaces. The first coat may be applied using a conventional application process, such as by spray, centrifugal disc, brush, slush, or screed. A centrifugal Disc is a high speed rotating disc which atomizes and expels liner by centrifugal force. Slush means to pour an excess of liner into the case allow excess to drain prior to cure. The liner thickness is controlled by viscosity. Screed uses a template or guide to contour and control thickness.

The first coat of liner is partially or fully cured prior to application of a subsequent coat. The second coat (approximately 5 mils thick) of liner, or "wet coat," is applied over the first coat but not cured prior to propellant casting. The second coat of liner is preferably formulated to contain the appropriate ballistic modifier(s) in place of all or a portion of the total filler content. A two coat system is preferred although a minimum of one wet coat over any number of cured coats will produce the desired results. The propellant is cast into the motor chamber under vacuum to promote intimate contact and intermixing of the wet coat liner with the adjacent propellant layer.

This process results in dispersement of the wet coat liner and contained ballistic modifier into the adjacent propellant layer and a corresponding modification of interfacial propellant burn rate. The interfacial propellant burn rate may be decreased by incorporating burn rate suppressants into the wet coat liner formulation or increased by incorporating burn rate catalysts. The degree of burn rate tailoring may be controlled by the type of modifier selected, modifier content in the liner, liner thickness, liner viscosity and other process variables affecting the degree of dispersement in the adjacent propellant layer.

The robust liner and liner process described herein provide several important features. For instance, it has been found that diammonium phosphate functions both as an oligomer catalyst and as a burn rate suppressant. This catalyst causes excess isocyanate curative to oligomerize into dimer, trimer and tetramer structures. The isocyanate groups on the oligomers also react with the hydroxyl groups on the polymer forming the conventional urethane linkages. Variations in the NCO/OH ratio affect the degree of oligomerization but have little effect on propellant to liner bond properties. The result is a stoichiometric insensitive formulation. Oligomer structures of some isocyanates also enhance liner mechanical properties. When diammonium phosphate is used in a unique two coat (cured coat and wet coat) liner process, it has the capability to alter the interfacial propellant burn rate and function as a burn rate suppressant.

A two coat liner process is used to modify and control the interfacial propellant burn rate. The first coat of robust liner is applied to the interior of the case and cured or partially cured. A second, wet (uncured) liner coat is applied over the first cured coat. The uncured liner in the second coat, containing the burn rate modifier additive, intermixes with the adjacent propellant layer during vacuum casting. This intermixing provides physical transport and dispersion of the burn rate modifier into the adjacent propellant layer and affords a method to tailor and control the interfacial propellant burn rate.

A colorant is preferably used to label the second liner coat and affords a visual and/or a ultraviolet ("UV") fluorescence detection method for verification of complete coverage and thickness control.

The following examples are offered to further illustrate the present invention. These examples are intended to be purely exemplary and should not be viewed as a limitation on any claimed embodiment.

EXAMPLE 1

Robust Liner

A robust liner was formulated having the ingredient composition set forth below in Table 1A, with NCO/OH ratios ranging from 1.5 to 4.5:

TABLE 1A

| Ingredient | Weight % |
|---|---|
| HTPB } DDI | 58.7 |
| HX-752 | 4.9 |
| $(NH_4)_2HPO_4$ | 19.6 |
| $TiO_2$ | 14.6 |
| $SiO_2$ | 2.0 |
| Triphenyl bismuth | 0.2 |

The liner was cast into sheets for uniaxial tensile specimens, used to bond steel tensile adhesion buttons and used to bond a 88 percent solids HTPB/Al/AP propellant and a 90 percent solids HTPB/Al/AP/HMX propellant to an insulator based on an EPDM (ethylenepropylenediene monomer) polymer system. The uniaxial tensile specimen sheets and tensile adhesion buttons were cured for 336 hours at 135° F. prior to test. The liner for the propellant to liner to insulation (PLI) samples was cured for 48 hours at 135° F. prior to propellant cast and then co-cured with the propellant for an additional 288 hours at 135° F. prior to test. The liner uniaxial tensile properties are presented in Table 1B, below. The robust liner exhibited uniaxial tensile values of 900 to 1400 psi with elongations of 430 to 610 percent.

TABLE 1B

| Liner Uniaxial Mechanical Properties | | |
|---|---|---|
| NCO/OH | Corrected Tensile Stress (psi) | Elongation (%) |
| 1.5 | 1090 | 430 |
| 2.0 | 1170 | 450 |
| 2.25 | 1160 | 530 |
| 2.5 | 1290 | 460 |
| 3.0 | 1400 | 480 |
| 4.5 | 900 | 610 |

Liner to steel adhesion data are presented in Table 1C, below. Tensile adhesion to steel ranged from 430 to 550 psi.

TABLE 1C

| Liner-to-Steel Adhesion | |
|---|---|
| NCO/OH | Tensile (psi) |
| 1.5 | 430 |
| 2.0 | 480 |
| 2.5 | 530 |
| 3.0 | 550 |

The PLI bond data are presented in Table 1D, below. The tensile strength of the PLI bond was 178 to 184 psi for the 88 percent solids HTPB/Al/AP propellant and 221 to 227 psi for the 90 percent solids HTPB/Al/AP/HMX propellant with cohesive propellant failure modes. Ninety degree peel values ranged from 21 to 33 and 12 to 18 pli, respectively, also with cohesive propellant failure modes.

TABLE 1D

| Propellant/Liner/Insulation Bond Data | | | | |
|---|---|---|---|---|
| Propellant Type | Insulation | NCO/OH | Tensile Stress (psi) | 90° Peel (pli) |
| HTPB/Al/AP (88% solids) | EPDM | 1.5 | 178 | 33 |
| | | 2.25 | 176 | 21 |
| | | 3.0 | 184 | 29 |
| HTPB/Al/AP/HMX (90% solids) | EPDM | 1.5 | 221 | 12 |
| | | 2.0 | 226 | 18 |
| | | 2.5 | 226 | 16 |
| | | 3.0 | 227 | 18 |

The foregoing data demonstrate robustness and process insensitivity over a wide range of stoichiometry over which conventional liners fail to cure.

EXAMPLE 2

Robust Liner With TMXDI Substitution

A robust liner was formulated having the ingredient composition set forth in Table 1A, except that m-tetramethyl xylene diisocyanate was used as the curing agent. The NCO/OH ratios formulated were 1.50, 2.25 and 3.00. The liner was cast into sheets for uniaxial tensile specimens and used to bond a 88 percent solids HTPB/Al/AP propellant to an EPDM-based insulator. The uniaxial tensile specimen sheets were cured for 336 hours at 135° F. prior to test. The liner for the propellant to liner to insulation (PLI) samples was cured for 48 hours at 135° F. prior to propellant cast and then co-cured with the propellant for an additional 288 hours at 135° F. prior to test. The liner uniaxial tensile properties are presented in Table 2A. The robust liner exhibited uniaxial tensile values of 1760 to 2630 psi with maximum enhanced uniaxial tensile properties at a NCO/OH ratio of 2.25. Elongation ranged from 360 to 480 percent.

TABLE 2A

Liner Uniaxial Mechanical Properties

| NCO/OH | Corrected Tensile Stress (psi) | Elongation (%) |
|---|---|---|
| 1.5 | 1760 | 480 |
| 2.25 | 2630 | 410 |
| 3.0 | 1820 | 360 |

The PLI bond data are presented in Table 2B. The tensile strength of the PLI bond was 184 to 188 psi with a cohesive propellant failure mode. Ninety degree peel values ranged from 24 to 36 pli also with cohesive propellant failure modes.

TABLE 2B

Propellant/Liner/Insulation Bond Data

| Propellant Type | Insulation | NCO/OH | Tensile Stress (psi) | 90° Peel (pli) |
|---|---|---|---|---|
| HTPB/Al/AP (88% solids) | EPDM | 1.5 | 184 | 36 |
| | | 2.25 | 188 | 28 |
| | | 3.0 | 186 | 24 |

The foregoing data demonstrate liner robustness and process insensitivity over a wide range of stoichiometry and enhanced mechanical properties with an alternate isocyanate curative.

EXAMPLE 3

Robust Liner with IPDI Substitution

A robust liner was formulated having the ingredient composition set forth in Table 1A, except that isophorone diisocyanate (IPDI) was used as the curing agent. The NCO/OH with NCO/OH ratios of 1.50, 2.25 and 3.00. The liner was cast into sheets for uniaxial tensile specimens. The uniaxial tensile specimen sheets were cured for 336 hours at 135° F. prior to test. The liner uniaxial tensile properties are presented in Table 3A. The robust liner exhibited uniaxial tensile values of 2450 to 3710 psi with elongations of 380 to 590 percent.

TABLE 3A

Liner Uniaxial Mechanical Properties

| NCO/OH | Corrected Tensile Stress (Psi) | Elongation (%) |
|---|---|---|
| 1.5 | 2450 | 590 |
| 2.25 | 3710 | 510 |
| 3.0 | 3570 | 380 |

These data also demonstrate enhanced mechanical properties, robustness and process insensitivity over a wide range of stoichiometry. They also demonstrate the ability to substitute isocyanate curatives in the robust liner formulation.

EXAMPLE 4

Robust Liner with Inert Filler Substitution

A robust liner was formulated having the ingredient composition set forth in Table 1A and a NCO/OH ratio of 2.25, except that two alternate fillers, carbon black and silicon dioxide, were substituted for the titanium dioxide. The liner was cast into sheets for uniaxial tensile properties and cured for 336 hours at 135° F. prior to test. Tensile properties, presented in Table 4A, indicate nominal liner properties and demonstrate the ability to substitute inert fillers in the robust liner formulation.

TABLE 4A

Liner Uniaxial Mechanical Properties

| Inert Filler | NCO/OH | Corrected Tensile Stress (psi) | Elongation (%) |
|---|---|---|---|
| Carbon Black | 2.25 | 1490 | 450 |
| SiO$_2$ | 2.25 | 1830 | 570 |

EXAMPLE 5

Robust Liner with Cure Catalyst Substitution

A robust liner was formulated in accordance with Table 1A with NCO/OH ratios of 1.5, 3.0 and 4.5. Dibutyl tin dilaurate (DBTDL) was substituted for the triphenyl bismuth cure catalyst. The liner was cast into sheets for uniaxial tensile specimens and used to bond a 90 percent solids HTPB/Al/AP/HMX propellant to an EPDM-based insulator. The uniaxial tensile specimen sheets were cured for 336 hours at 135° F. prior to test. The liner for the propellant to liner to insulation (PLI) samples was cured for 48 hours at 135° F. prior to propellant cast and then co-cured with the propellant for an additional 288 hours at 135° F. prior to test. The liner uniaxial tensile properties are presented in Table 5A. The robust liner exhibited uniaxial tensile values of 890 to 1430 psi with elongations ranging from 470 to 650 percent.

TABLE 5A

Liner Uniaxial Mechanical Properties

| NCO/OH | Corrected Tensile Stress (psi) | Elongation (%) |
|---|---|---|
| 1.5 | 1200 | 470 |
| 3.0 | 1430 | 600 |
| 4.5 | 890 | 650 |

The PLI bond data are presented in Table 5B. The tensile strength of the PLI bond was 208 to 213 psi with a cohesive propellant failure mode. Ninety degree peel values ranged from 11 to 16 pli also with cohesive propellant failure modes.

TABLE 5B

Propellant/Liner/Insulation Bond Data

| Propellant Type | Insulation | NCO/OH | Tensile Stress (psi) | 90° Peel (pli) |
|---|---|---|---|---|
| HTPB/Al/AP/HMX (90% solids) | EPDM | 1.5 | 208 | 11 |
| | | 3.0 | 208 | 16 |
| | | 4.5 | 213 | 13 |

These data demonstrate liner robustness and process insensitivity over a wide range of stoichiometry with an alternate cure catalyst.

Figure 1:
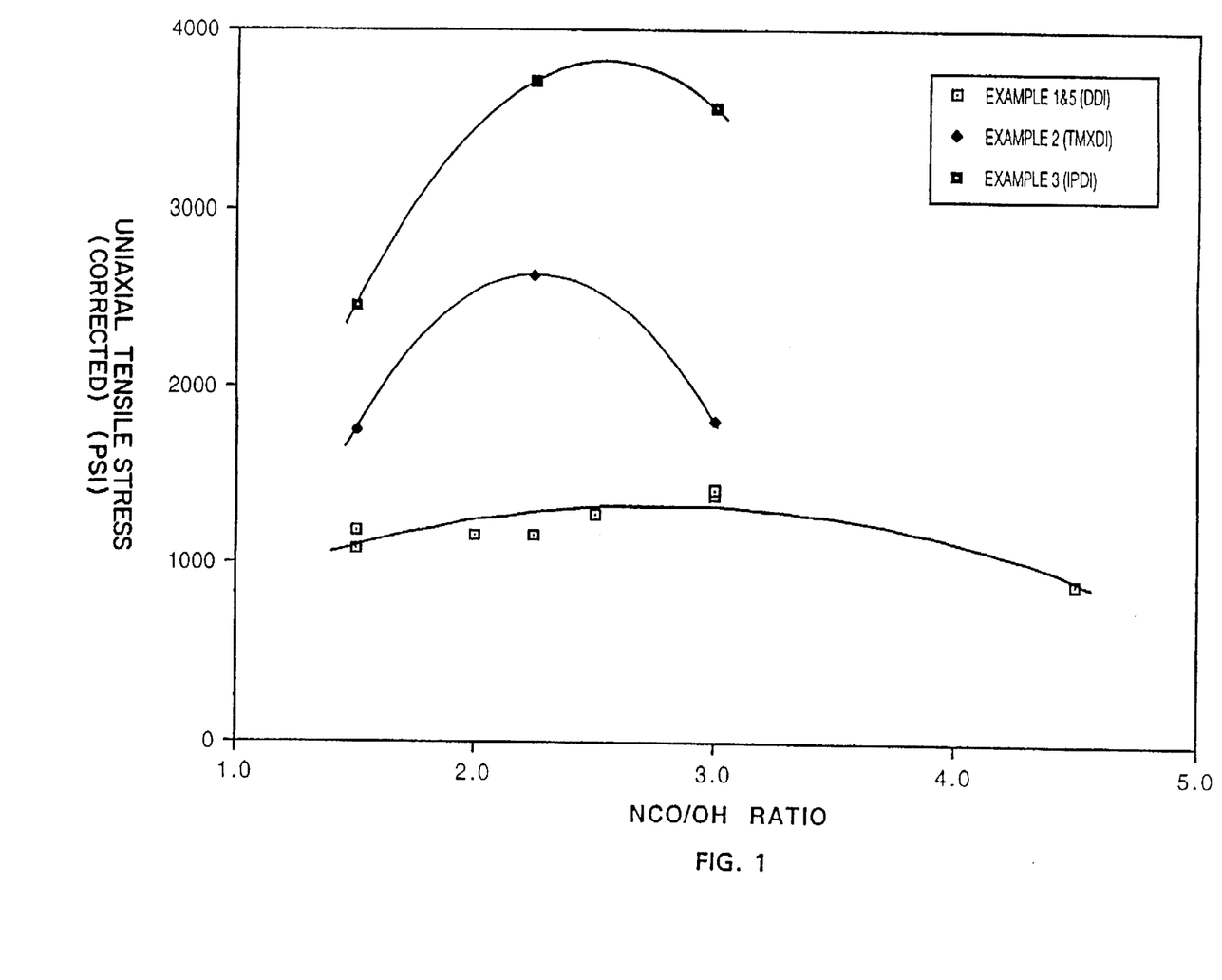
FIG. 1 is a graph illustrating the liner uniaxial tensile strength for the liner compositions of Examples 1, 2, 3, and 5 as a function of NCO/OH ratio.
Figure 2:
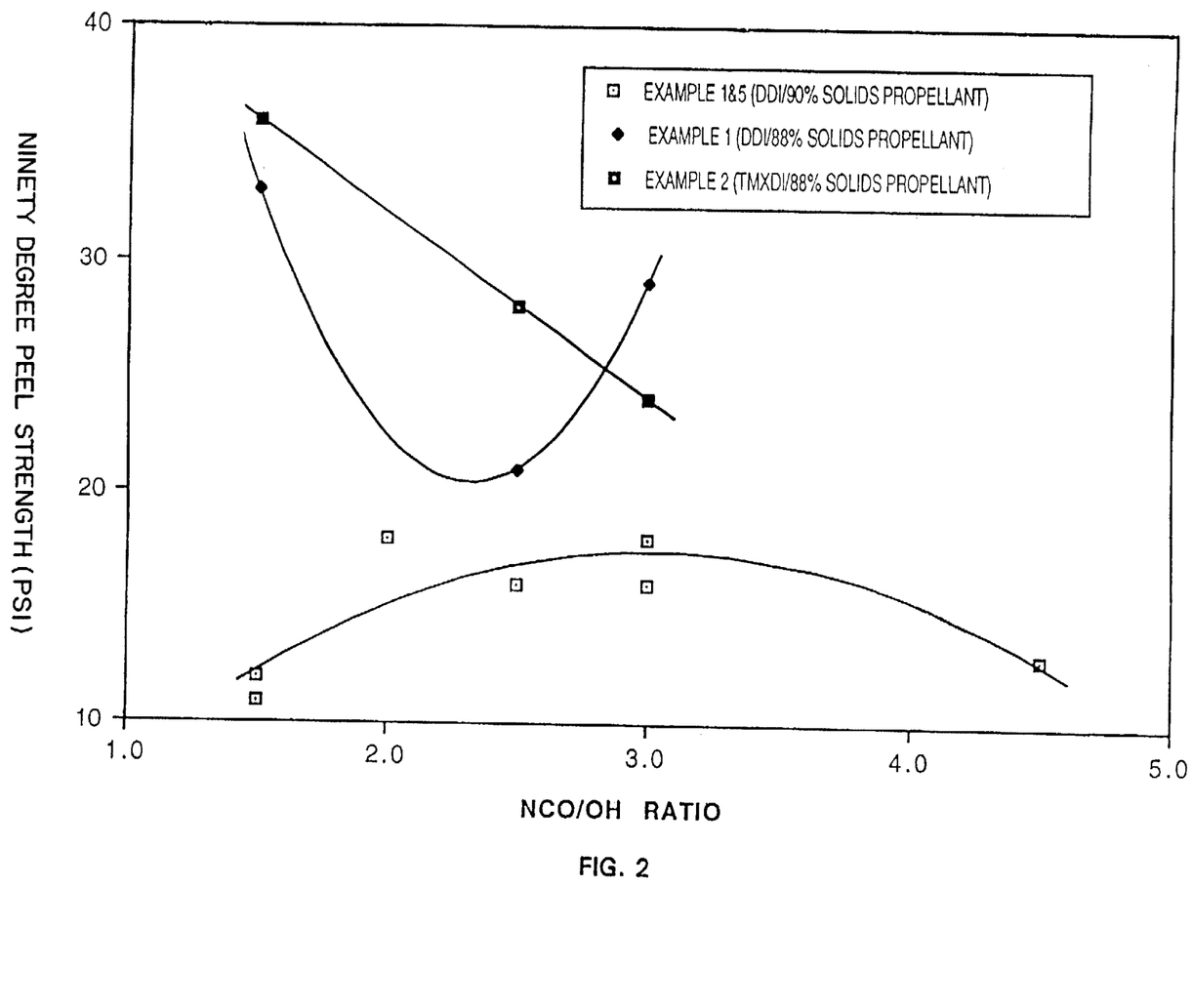
FIG. 2 is a graph illustrating the 90-degree peel strength of a propellant-to-liner-to-insulation bondline as a function of NCO/OH ratio for two different propellant compositions and two different liner compositions.
Figure 3:
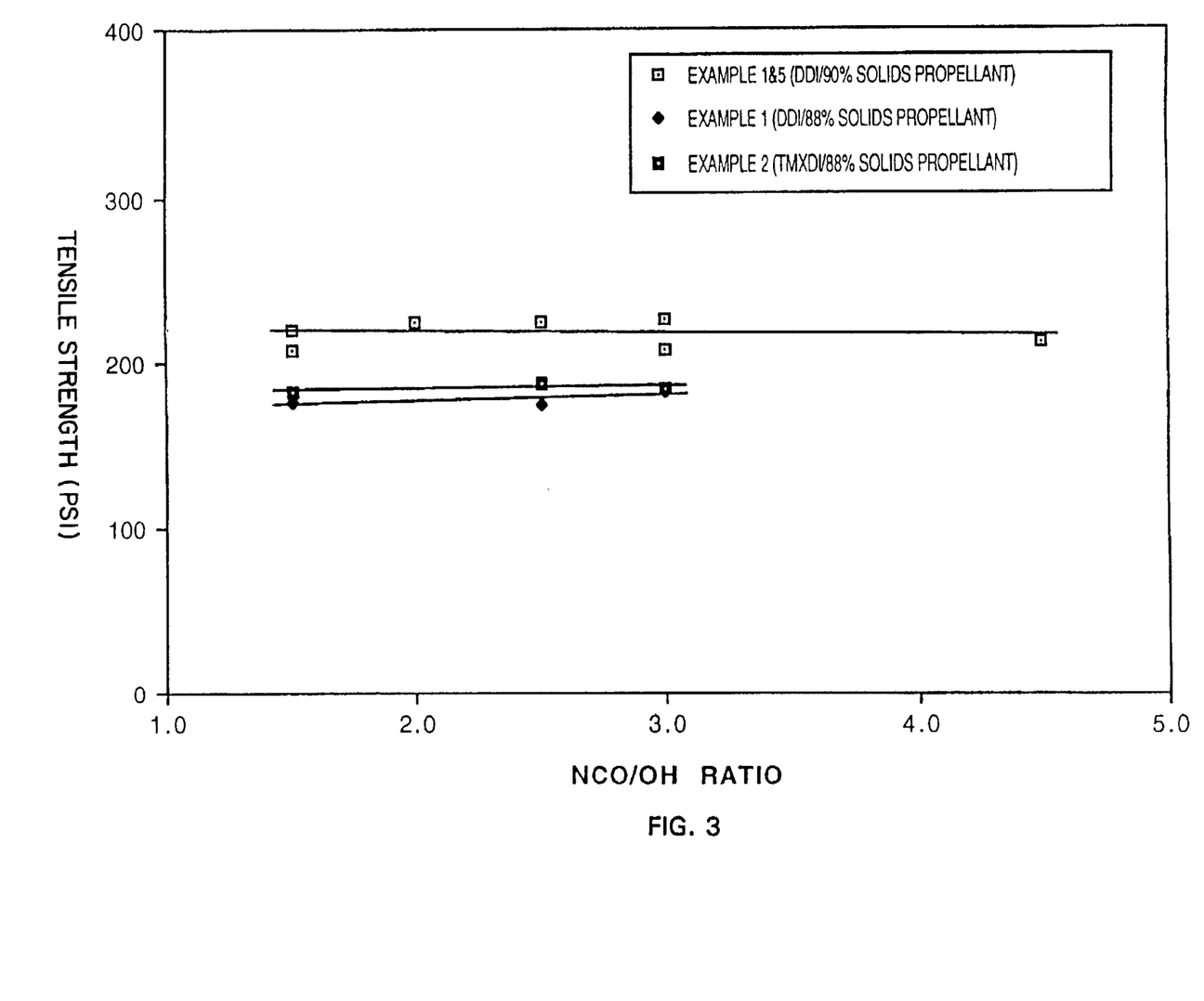
FIG. 3 is a graph illustrating the tensile adhesion strength of a propellant-to-liner-to-insulation bondline as a function of NCO/OH ratio for two different propellant compositions and two different liner compositions.

Some of the foregoing results of Examples 1 through 5 are graphically illustrated in FIGS. 1 through 3. FIG. 1 shows liner uniaxial tensile strength as a function of liner isocyanate/hydroxyl equivalents ratio (NCO/OH) for three liner compositions. The illustrated liner compositions are based on DDI (Examples 1 and 5), TMXDI (Example 2), and IPDI (Example 3) diisocyanate curing agents catalyzed with either triphenyl bismuth (TPB) or dibutyl tin dilaurate (DBTDL) cure catalysts. The results illustrated in FIG. 1 suggest that good liner uniaxial tensile strength may be obtained with the DDI-cured liner over an extended NCO/OH range from 1.5 to 4.5. Enhanced uniaxial properties, i.e., significantly increased uniaxial tensile strength, are obtained with TMXDI-cured and IPDI-cured liners over an extended NCO/OH range of 1.5 to 3.0.

FIG. 2 shows 90-degree peel strength of a propellant-to-liner-to-insulation bondline as a function of liner NCO/OH ratio for two propellants (88 percent solids and 90 percent solids) and two liner compositions within the scope of the present invention. The illustrated liner compositions are based on DDI (Examples 1 and 5) and TMXDI (Example 2) diisocyanate curing agents catalyzed with either triphenyl bismuth (TPB) or dibutyl tin dilaurate (DBTDL) cure catalysts. The results illustrated in FIG. 2 suggest excellent propellant-to-liner-insulation bond integrity as measured by 90-degree peel strength over an extended NCO/OH range of 1.5 to 4.5 with DDI-cured liners and from 1.5 to 3.0 with TMXDI-cured liners. Failure modes were cohesive in the propellant, indicating that the interfacial strength exceeds the strength of the propellant.

FIG. 3 shows tensile strength of a propellant-to-liner-to-insulation bondline as a function of the liner NCO/OH ratio for two propellants (88 percent solids and 90 percent solids) and two liner compositions within the scope of the present invention. The illustrated liner compositions are based on DDI (Examples 1 and 5) and TMXDI (Example 2) diisocyanate curing agents catalyzed with either triphenyl bismuth (TPB) or dibutyl tin dilaurate (DBTDL) cure catalysts. The results illustrated in FIG. 3 suggest excellent propellant-to-liner-insulation bond integrity as measured by tensile strength over an extended NCO/OH range of 1.5 to 4.5 with DDI-cured liner and from 1.5 to 3.0 with TMXDI-cured liners. Failure modes were cohesive in the propellant, indicating that the interfacial strength exceeds the strength of the propellant.

These figures graphically demonstrate the robustness of the disclosed liner compositions and propellant-to-liner-to-insulation bondlines over an extended range of stoichiometry over which conventional liners fail to cure, and the enhanced mechanical properties attainable with certain curatives.

EXAMPLE 6

Robust Liner with Reactive Filler Concentration Variation

A robust liner was formulated having the ingredient composition set forth below in Table 6A, and with a NCO/OH ratio of 2.25. The diammonium phosphate reactive filler and carbon black inert filler concentrations were inversely varied in 5 part increments from 5 to 20 parts and from 30 to 15 parts, respectively, as shown.

TABLE 6A

| Ingredient | Composition (Parts) |
| --- | --- |
| HTPB | 58.7 |
| IPDI |  |
| HX-752 | 5.0 |
| $(NH_4)_2HPO_4$ | 5–20 |
| Carbon black | 30-15 |
| $SiO_2$ | 2.5 |
| DBTDL | 0.003 |

The liner was cast into sheets for uniaxial tensile specimens and used to bond a 88 percent solids HTPB/Al/AP propellant to an EPDM rubber insulation. The uniaxial tensile specimen sheets were cured for 336 hours at 135° F. prior to test. The liner for the propellant to liner to insulation (PLI) samples was cured for 48 hours at 135° F. prior to propellant cast and then co-cured with the propellant for an additional 288 hours at 135° F. prior to test.

The liner uniaxial tensile properties are presented in Table 6B, below. The robust liner exhibited uniaxial tensile values of 2730 to 3280 psi with elongation of 400 to 470 percent.

TABLE 6B

| Liner Uniaxial Tensile Properties | | |
| --- | --- | --- |
| $(NH_4)_2HPO_4$ (pph) | Corrected Tensile Stress (psi) | Elongation (%) |
| 5 | 3280 | 470 |
| 10 | 3180 | 420 |
| 15 | 3180 | 260 |
| 20 | 2730 | 400 |

The PLI bond data are presented in Table 6C. The tensile strength of the PLI bond ranged from 193 to 207 psi with cohesive propellant failure modes. Ninety degree peel values ranged from 15 to 20 pli, also with cohesive propellant failure modes.

TABLE 6C

| $(NH_4)_2HPO_4$ (pph) | Tensile Stress (psi) | 90° Peel (pli) |
| --- | --- | --- |
| 5 | 193 | 20 |
| 10 | 218 | 20 |
| 15 | 207 | 18 |
| 20 | 207 | 15 |

The foregoing data demonstrate a wide range of acceptable reactive filler contents over which oligomerization occurs and the liner functions as intended.

EXAMPLE 7

Process Insensitivity of Robust Liner

A robust liner was formulated having the ingredient composition set forth in Table 6A, with a NCO/OH ratio of 2.25 and a diammonium phosphate (DAP) content of 10 pph. A conventional liner was formulated having the ingredient composition set forth in Table 12B, below, and a NCO/OH ratio of 1.5. Liner and liner bondline samples were prepared under adverse process conditions of high relative humidity and residual moisture in the inert liner filler ingredient and insulation substrate. The carbon black and the EPDM insulation were conditioned six days at a relative humidity of 90 percent to simulate adverse process conditions. Control samples of carbon black and insulation were vacuum dried prior to use for comparative purposes. The liner was used to bond tensile specimens of EPDM/liner/EPDM and to bond a 90 percent solids HTPB/Al/AP/HMX propellant to EPDM insulation. Samples were prepared to evaluate four combinations of adverse and dry process conditions, as shown below:

| Sample # | Carbon Black | EPDM |
|---|---|---|
| A | Vacuum dried | Vacuum dried |
| B | Vacuum dried | 6 days at 90% RH |
| C | 6 days at 90% RH | Vacuum dried |
| D | 6 days at 90% RH | 6 days at 90% RH |

The tensile adhesion samples were cured for 336 hours at 135° F. prior to test. The liner for the PLI samples was cured for 48 hours at 135° F. prior to propellant cast then co-cured with the propellant for an additional 288 hours at 135° F.

The tensile properties of the EPDM/liner/EPDM samples are presented in Table 7A. The conventional liner exhibited high variability and sensitivity to the adverse process conditions. The tensile strength of the conventional liner samples ranged from 90 to 480 psi. Cohesive insulation failure modes were obtained with dry insulation samples. However, cohesive liner failure modes were obtained with wet insulation samples indicative of degraded liner. In contrast, the robust liner demonstrated process insensitivity. The tensile strength of the robust liner samples was consistent ranging from 430 to 520 psi with cohesive insulation failure modes under all conditions. Some liner void failures were also observed. These voids were presumably caused by carbon dioxide generated from the isocyanate-residual moisture reaction.

TABLE 7A

Tensile strength of EPDM/Liner/EPDM

| Liner Type | Sample # | Tensile Stress (psi) | Failure Mode |
|---|---|---|---|
| Conventional | A | 480 | CI |
|  | B | 90 | CL |
|  | C | 480 | CI |
|  | D | 120 | CL |
| Robust | A | 520 | CI |
|  | B | 430 | CI* |
|  | C | 510 | CI |
|  | D | 450 | CI* |

CI = cohesive insulation
CL = cohesive liner
*Some failure through voids in liner.

Propellant/liner/insulation bondline samples test results are presented in Table 7B. The conventional liner hardness, as determined by penetrometer testing, was 26 penetrometer units under dry conditions, but softened to 30 to 35 units with the addition of moisture to the carbon black and/or EPDM. The robust liner maintained a hardness of 22 to 23 penetrometer units under all conditions. The ninety-degree peel value obtained from conventional liner PLI samples varied form 17 to 27 pli with interfacial propellant to liner and cohesive liner failure modes which are indicative of a degraded bond. Robust liner PLI samples ranged from 32 to 37 pli with cohesive propellant failure modes under all conditions. The tensile strength of the PLI samples ranged from 201 to 247 psi and cohesive propellant failure modes for both liner samples when tested at 75° F. Samples tested at 135° F. failed predominately in the EPDM and did not discriminate bondline variations. However, the conventional liner samples did fail cohesively in the liner with combinations of wet carbon black and wet EPDM indicating liner degradation.

TABLE 7B

Propellant/Liner/Insulation Bond Strength

| Liner type/ Sample # | Hardness (penetrometer) | 90° Peel Stress (pli) | 90° Peel Failure mode | Tensile at 75° F. Stress (psi) | Tensile at 75° F. Failure mode | Tensile at 135° F. Stress (psi) | Tensile at 135° F. Failure mode |
|---|---|---|---|---|---|---|---|
| Conv./A | 26 | 17 | IPL | 239 | CP | 120 | CP |
| Conv./B | 34 | 27 | IPL | 207 | CP | 85 | CI |
| Conv./C | 30 | 21 | IPL | 234 | CP | 106 | CI |
| Conv./D | 35 | 27 | CL | 201 | SBF | 65 | CL |
| Robust/A | 22 | 32 | CP | 231 | CP | 70 | CI |
| Robust/B | 22 | 37 | CP | 240 | CP | 64 | CI |
| Robust/C | 22 | 32 | CP | 247 | CP | 80 | CI |
| Robust/D | 22 | 35 | CP | 239 | CP | 77 | CI |

IPL = interfacial propellant/liner
CI = cohesive insulation
CL = cohesive liner
CP = cohesive propellant
SBF = secondary bond failure These data demonstrate the process insensitivity of the robust liner and it's ability to function under adverse process conditions of high relative humidity and residual moisture in liner ingredients and in the insulation substrate. Conventional urethane liners are degraded under similar process conditions.

EXAMPLE 8

Bond Durability of Robust Liner

A robust liner was formulated in accordance with Table 1A with NCO/OH ratios of 1.50, 2.25 and 3.00. TMXDI and DDI were used as curative. The liner was cast into sheets for uniaxial tensile specimens and used to bond a 88 percent solids HTPB/ Al/AP propellant to an EPDM-based insulator. The uniaxial tensile specimen sheets were cured for 336 hours at 135° F. The liner for the propellant to liner to insulation (PLI) samples were cured for 48 hours at 135° F. prior to propellant cast and then co-cured with the propellant for an additional 288 hours at 135° F. The specimens were then aged for 0, 2 and 6 months at 145° F. and 6 months at 75° F. prior to test. The liner uniaxial tensile properties and the PLI bond data are presented in Table 8A. The robust liner exhibited uniaxial tensile values of 950 to 1870 psi with the DDI cured formulation and 1040 to 2910 psi with the TMXDI cured formulation. The tensile strength of the PLI bond was 176 to 208 psi for the 88 percent solids HTPB/ Al/AP propellant with cohesive propellant failure modes. Ninety degree peel values ranged from 21 to 41 pli also with cohesive propellant failure modes.

TABLE 8A

Liner and PLI Bondline Data

| Cross-linker | NCO/OH | Aging Conditions Time (months) | Aging Conditions Temp. (°F.) | Liner Uni-axial Tensile (psi) | Prop./liner/insul. Tensile (psi) | Prop./liner/insul. 90° Peel (pli) |
|---|---|---|---|---|---|---|
| DDI | 1.5 | 0 | N/A | 1190 | 178 | 32 |
|  |  | 2 | 145 | 950 | 186 | 36 |
|  |  | 6 | 145 | 1150 | 202 | 39 |
|  |  | 6 | 75 | 1480 | 191 | 35 |
| DDI | 2.25 | 0 | N/A | 1160 | 176 | 21 |
|  |  | 2 | 145 | 1370 | 183 | 27 |
|  |  | 6 | 145 | 1870 | 203 | 28 |
|  |  | 6 | 75 | 1410 | 191 | 27 |
| DDI | 3.00 | 0 | N/A | — | 184 | 29 |
|  |  | 2 | 145 | — | 181 | 32 |
|  |  | 6 | 145 | — | 203 | 27 |
|  |  | 6 | 75 | — | 188 | 23 |
| TMXDI | 1.5 | 0 | N/A | 1760 | 184 | 36 |
|  |  | 2 | 145 | 1710 | 186 | 41 |
|  |  | 6 | 145 | 2340 | 206 | 36 |
|  |  | 6 | 75 | 2150 | 191 | 35 |
| TMXDI | 2.25 | 0 | N/A | 2630 | 188 | 28 |
|  |  | 2 | 145 | 2810 | 193 | 33 |
|  |  | 6 | 145 | 1910 | 208 | 41 |
|  |  | 6 | 75 | 2740 | 199 | 31 |
| TMXDI | 3.00 | 0 | N/A | 1820 | 186 | 24 |
|  |  | 2 | 145 | 2080 | 200 | 28 |
|  |  | 6 | 145 | 1040 | 204 | 39 |
|  |  | 6 | 75 | 2910 | 200 | 30 |

These data demonstrate robustness, process insensitivity and bond durability of the robust liner over a wide range of stoichiometry and with two alternate isocyanate curatives.

EXAMPLE 9

Interfacial Propellant Burn Rate Control

A robust liner formulated having the ingredient composition set forth below in Table 9A was used in a unique two coat process to demonstrate interfacial propellant burn rate control.

TABLE 9A

| Ingredient | Composition (Parts) Cured Coat | Composition (Parts) Wet Coat |
|---|---|---|
| HTPB | 57.0* | 57.0* |
| TMXDI |  |  |
| HX-752 | 3.0 | 3.0 |
| $(NH_4)_2HPO_4$ | 40.0 | 20.0 |
| *NCO/OH = 1.5 |  |  |

The first coat of liner was applied to EPDM insulation to a thickness of 20 mils thick and precured for 48 hours at 135° F.

The second coat of liner was applied over the first coat to a thickness of approximately 5 mils. An 88 percent solids HTPB/Al/AP propellant, defined in Table 9B, was vacuum cast against the second, wet (uncured) liner coat.

TABLE 9B

| Propellant composition Ingredient | Weight % |
|---|---|
| HTPB | 8 |
| TMXDI |  |
| TEPANOL (bonding agent) |  |
| ODI (octadecyl isocyanate) |  |
| TPB (triphenyl bismuth) |  |
| Plasticizer | 4 |
| Al | 1 |
| Ammonium perchlorate (AP) | 87 |
| Ferric oxide |  |

A second set of samples was prepared using a single coat of a conventional liner, defined in Table 9C, for comparative purposes.

TABLE 9C

| Conventional Liner Composition Ingredient | Composition (Parts) |
|---|---|
| HTPB | 57.0* |
| TMXDI |  |
| HX-752 | 3.0 |
| $TiO_2$ | 40.0 |
| TPB | 0.1 |
| *NCO/OH = 1.5 |  |

The propellant and liner coats were co-cured for an additional 240 hours at 135° F. Propellant bondline samples, approximately 1.5×1×0.25 inches, were prepared and ignited in a confined pressure chamber containing an observation port (window bomb) to visually observe and record (high speed film) the progression of the flame front and any propellant burn rate gradients present. The tests were conducted at a pressure of 1,700 psia and a temperature of 75° F. Photographs of the tests conducted with the conventional liner indicate an extreme propellant burn rate gradient at the liner interface and extreme coning of the propellant during the test. Photographs of the tests conducted with the disclosed liner indicate a flat, neutral flame front and no propellant burn rate gradients present. These data demonstrate the ability to tailor, control and eliminate interfacial propellant burn rate gradients with the disclosed liner and a unique two coat liner process.

EXAMPLE 10

Interfacial Burn Rate Control with an Alternate Burn Rate Modifier

A robust liner having the ingredient composition set forth below in Table 10A was used in a unique two coat process to demonstrate interfacial propellant burn rate control. Oxamide was substituted for the diammonium phosphate burn rate modifier in the second, wet (uncured) liner coat.

TABLE 10A

| Ingredient | Composition (Parts) | |
|---|---|---|
| | Cured Coat | Wet Coat |
| HTPB } | 57.0* | 57.0* |
| TMXDI } | | |
| HX-752 | 3.0 | 3.0 |
| (NH$_4$)$_2$HPO$_4$ | 40.0 | |
| Oxamide | | 20.0 |
| *NCO/OH = 1.5 | | |

The first coat of liner was applied to EPDM insulation to a thickness of 20 mils thick and precured for 48 hours at 135° F. The second coat of liner was applied over the first coat to a thickness of approximately 5 mils. An 88 percent solids HTPB/Al/AP propellant, defined in Table 9B, was vacuum cast against the second, wet (uncured) liner coat. The propellant and liner coats were co-cured for an additional 240 hours at 135° F. Propellant bondline samples, approximately 1.5×1×0.25-inches, were prepared and ignited in a confined pressure chamber containing an observation port (window bomb) to visually observe and record (high speed film) the progression of the flame front and any propellant burn rate gradients present. The tests were conducted at a pressure of 1,700 psia and a temperature of 75° F. Photographs of the tests conducted with the disclosed liner indicate a flat, neutral flame front and no propellant burn rate gradients present. These data demonstrate the ability to tailor, control and eliminate interfacial propellant burn rate gradients with the disclosed liner,a unique two coat liner process and an alternate burn rate modifier used as a liner filler material.

EXAMPLE 11

Interfacial Burn Rate Control with Mixed Fillers

A robust liner having the ingredient composition set forth below in Table 11A was used in a unique two coat process to demonstrate interfacial propellant burn rate control. An inert filler, titanium dioxide, was used in combination with the diammonium phosphate burn rate modifier in the second, wet (uncured) liner coat.

TABLE 11A

| Ingredient | Composition (Parts) | |
|---|---|---|
| | Cured Coat | Wet Coat |
| HTPB } | 57.0* | 57.0* |
| TMXDI } | | |
| HX-752 | 3.0 | 3.0 |
| TiO$_2$ | 7.0 | 7.0 |
| (NH$_4$)$_2$HPO$_4$ | 33.0 | 33.0 |
| TPB | 0.1 | 0.1 |
| *NCO/OH = 1.5 | | |

The first coat of liner was applied to EPDM insulation to a thickness of 20 mils thick and precured for 48 hours at 135° F. The second coat of liner was applied over the first coat to a thickness of approximately 5 mils. An 88 percent solids HTPB/Al/AP propellant, defined in Table 9B, was vacuum cast against the second, wet (uncured) liner coat. The propellant and liner coats were co-cured for an additional 240 hours at 135° F. Propellant bondline samples, approximately 1.5×1×0.25 inches, were prepared and ignited in a confined pressure chamber containing an observation port (window bomb) to visually observe and record (high speed film) the progression of the flame front and any propellant burn rate gradients present. The tests were conducted at a pressure of 1,700 psia and a temperature of 75° F. Photographs of the tests conducted with the disclosed liner indicate a flat, neutral flame front and no propellant burn rate gradients present. These data demonstrate the ability to tailor, control and eliminate interfacial propellant burn rate gradients with the disclosed liner, a unique two coat liner process and an inert substance and a burn rate modifier used as a liner filler material.

EXAMPLE 12

Interfacial Burn Rate Control in Extinguishment Motors

A robust liner having the ingredient composition set forth below in Table 12A was used in a unique two coat process to demonstrate interfacial propellant burn rate control.

TABLE 12A

| Ingredient | Composition (Parts) | |
|---|---|---|
| | Cured Coat | Wet Coat |
| HTPB } | 39.86* | 44.68* |
| TMXDI } | | |
| HX-752 | 5.0 | 4.98 |
| TiO$_2$ | 20.0 | — |
| (NH$_4$)$_2$HPO$_4$ | 35.0 | 49.8 |
| SiO$_2$ | — | 0.4 |
| TPB | 0.14 | 0.14 |
| *NCO/OH = 1.5 | | |

The liner was used to coat the interior of a 5-inch diameter× 9-inch long rocket motor case consisting of an insulator on the inside diameter of the case and a center inhibitor. A conventional liner, defined in Table 12B, was applied to a second rocket motor case for comparative purposes.

TABLE 12B

Conventional Liner Composition

| Ingredient | Composition (Parts) | |
|---|---|---|
| | Cured Coat | Wet Coat |
| HTPB } | 60.59* | 62.65* |
| IPDI } | | |
| HX-868 | 3.28 | 3.39 |
| Carbon Black | 32.75 | 33.86 |
| SiO$_2$ | 3.38 | 0.10 |
| *NCO/OH = 1.5 | | |

The first coat of liner was applied to insulation and inhibitor to a thickness of 20 mils thick and precured for 48 hours at 135° F. The second coat of liner was applied over the first coat to a thickness of approximately 5 mils. An 88 percent solids HTPB/Al/AP propellant, defined in Table 9B, was vacuum cast against the second, wet (uncured) liner coat. The propellant and liner coats were co-cured for an additional 240 hours at 135° F. The motors were static tested at a chamber pressure of approximately 1700 psia and extinguished prior to completion of burn. A replicate casting of the two extinguished propellant grains was made in order to document the effect of burn rate gradients. The replicate surface of propellant grain "A" containing the conventional liner had an uneven surface tapered towards the bondlines indicating moderate interfacial burn rate gradients adjacent to the insulator and center inhibitor bondlines. The replicate surface of propellant grain "B" containing the disclosed liner and liner process had a relatively flat combustion service indicating uniform flame front advancement and little or no burn rate gradients. These data demonstrate the ability of the disclosed liner and liner process to control and eliminate interfacial propellant burn rate gradients in subscale rocket motors.

EXAMPLE 13

Interfacial Propellant Burn Rate Control in Full Scale Tactical Motor

A robust liner having the ingredient composition set forth below in Table 13A was used in a unique two coat process to demonstrate interfacial propellant burn rate control.

TABLE 13A

| Ingredient | Composition (Parts) | |
| --- | --- | --- |
| | Cured Coat | Wet Coat |
| HTPB | 58.13* | 44.68* |
| TMXDI | | |
| HX-752 | 4.84 | 4.97 |
| TiO$_2$ | 14.53 | — |
| (NH$_4$)$_2$HPO$_4$ | 19.38 | 49.65 |
| SiO$_2$ | 2.91 | 0.63 |
| TPB | 0.21 | 0.07 |
| Rhodamine B (dye) | — | 0.005 |
| *NCO/OH = 1.5 | | |

The liner was used to coat the interior of a full scale 9-inch diameter×105-inch long end burning tactical rocket motor case consisting of an insulator on the inside diameter of the case and a center inhibitor. The first coat of liner was applied to insulation and inhibitor to a thickness of 20 mils thick and precured for 48 hours at 135° F. The second coat of liner was applied over the first coat to a thickness of approximately 5 mils. A Rhodamine B dye was added to the second coat of liner to provide visual detection, coverage and thickness control. An 88 percent solids HTPB/Al/AP propellant, defined in Table 9B, was vacuum cast against the second, wet (uncured) liner coat. The propellant and liner coats were co-cured for an additional 240 hours at 135° F. The motors were static tested at a chamber pressure of approximately 1700 psia. A pressure versus time trace was obtained which showed a relatively neutral, constant pressure motor burn indicating a constant propellant burning surface, uniform flame front advancement, and the absence of interfacial propellant burn rate gradients. These data demonstrate the ability of the disclosed liner and liner process to tailor, control and eliminate interfacial propellant burn rate gradients in a full scale, end burning, tactical rocket motor.

From the foregoing, it will be appreciated that the present invention provides a solid rocket motor propellant liner which is insensitive to large variations in stoichiometry and which is able to modify the ballistic properties of the adjacent interfacial propellant layer.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A solid rocket propellant polyurethane liner composition comprising:
   a polymeric binder having a plurality of reactive hydroxyl functional groups and a curing agent having a plurality of reactive isocyanate functional groups, wherein the quantity of binder and curing agent are selected such that the NCO/OH equivalents ratio is in the range from 1.5 to 4.5;
   a bonding agent present in the liner composition in an amount ranging from about 3% to about 5%, by weight; and
   a catalyst system consisting of a latent oligomer catalyst for promoting the oligomerization of the curing agent, wherein the latent oligomer catalyst is diammonium phosphate and is present in the liner composition in an amount ranging from about 5% to about 50%, by weight.

2. A solid rocket propellant polyurethane liner composition as defined in claim 1, wherein the quantity of binder and curing agent are selected such that the NCO/OH ratio is in the range from about 2 to about 4.

3. A solid rocket propellant polyurethane liner composition as defined in claim 1, wherein the quantity of binder and curing agent are selected such that the NCO/OH ratio is in the range from about 2 to about 3.

4. A solid rocket propellant polyurethane liner composition as defined in claim 1, further comprising an inert filler present in the liner composition in an amount ranging from about 10% to about 30%, by weight.

5. A solid rocket propellant polyurethane liner composition as defined in claim 4, wherein the filler is selected from titanium dioxide (TiO$_2$), carbon black, and silicon dioxide.

6. A solid rocket propellant polyurethane liner composition as defined in claim 1, wherein the combination of binder and curing agent is present in the liner composition in an amount ranging from about 35% to 60%, by weight.

7. A solid rocket propellant polyurethane liner composition as defined in claim 1, wherein the curing agent is a diisocyanate curing agent.

8. A solid rocket propellant polyurethane liner composition as defined in claim 7, wherein the curing agent is selected from m-tetramethyl xylene diisocyanate (TMXDI), isophorone diisocyanate (IPDI), dimeryl diisocyanate (DDI), and toluene 2,4-diisocyanate (TDI).

9. A solid rocket propellant polyurethane liner composition as defined in claim 1, wherein the bonding agent is a polyfunctional aziridine compound.

10. A solid rocket propellant polyurethane liner composition as defined in claim 1, further comprising a colorant.

11. A solid rocket propellant polyurethane liner composition as defined in claim 10, wherein the colorant is rhodamine B.

12. A solid rocket propellant polyurethane liner composition comprising:
   a polymeric binder having a plurality of reactive hydroxyl functional groups and a curing agent having a plurality of reactive isocyanate functional groups, wherein the quantity of binder and curing agent are selected such that the NCO/OH ratio is in the range from 1.5 to 4.5, wherein the combination of binder and curing agent is present in the liner composition in an amount ranging from about 35% to 60%, by weight, and wherein the curing agent is selected from m-tetramethyl xylene diisocyanate (TMXDI), isophorone diisocyanate (IPDI), and dimeryl diisocyanate (DDI);
   a bonding agent present in the liner composition in an amount ranging from about 3% to about 5%, by weight, wherein the bonding agent is a polyfunctional aziridine compound; and a catalyst system consisting of a latent oligomer catalyst for promoting the oligomerization of the curing agent, wherein the latent oligomer catalyst is diammonium phosphate (($NH_4$)$_2$$HPO_4$) present in the liner composition in an amount ranging from about 5% to about 50%, by weight.

13. A solid rocket propellant polyurethane liner composition as defined in claim 12, wherein the quantity of binder and curing agent are selected such that the NCO/OH ratio is in the range from about 1.5 to about 4.

14. A solid rocket propellant polyurethane liner composition as defined in claim 12, wherein the quantity of binder and curing agent are selected such that the NCO/OH ratio is in the range from about 2 to about 3.

15. A solid rocket propellant polyurethane liner composition as defined in claim 12, further comprising an inert filler present in the liner composition in an amount ranging from about 5% to about 40%, by weight.

16. A solid rocket propellant polyurethane liner composition as defined in claim 15, wherein the filler is selected from titanium dioxide ($TiO_2$), carbon black, and silicon dioxide.

17. A solid rocket propellant polyurethane liner composition as defined in claim 12, further comprising a colorant.

18. A solid rocket propellant polyurethane liner composition as defined in claim 17, wherein the colorant is rhodamine B.

19. A solid rocket propellant polyurethane liner composition as defined in claim 1, wherein the NCO/OH ratio is in a range of from 2.25 to 4.5.

20. A solid rocket propellant polyurethane liner composition as defined in claim 11, wherein the NCO/OH ratio is in a range of from 2.25 to 4.5.

* * * * *